(12) United States Patent
Kuan et al.

(10) Patent No.: US 8,301,734 B1
(45) Date of Patent: *Oct. 30, 2012

(54) CLIENT-BASED SOLUTION FOR SEAMLESS ACCESS TO APPLICATIONS ACROSS NETWORKS

(75) Inventors: David Kuan, Vienna, VA (US); Ramesh Kalathur, Fairfax, VA (US); Moshe Stoler, Gaithersburg, MD (US); Ojas T. Choksi, Herndon, VA (US); Trinh D. Vu, Ashburn, VA (US); Hung Bui, Chantilly, VA (US)

(73) Assignee: Nextel Communications, Inc., Reston, VA (US)

( * ) Notice: Subject to any disclaimer, the term of this patent is extended or adjusted under 35 U.S.C. 154(b) by 1048 days.

This patent is subject to a terminal disclaimer.

(21) Appl. No.: 11/634,290

(22) Filed: Dec. 5, 2006

Related U.S. Application Data

(63) Continuation-in-part of application No. 11/527,930, filed on Sep. 26, 2006.

(51) Int. Cl.
*G06F 15/177* (2006.01)

(52) U.S. Cl. ...... 709/220; 709/227; 455/567; 455/552.1

(58) Field of Classification Search ............... 709/227, 709/220; 455/567, 552.1
See application file for complete search history.

(56) References Cited

U.S. PATENT DOCUMENTS

| | | | |
|---|---|---|---|
| 6,553,232 B1 * | 4/2003 | Shaffer et al. ................ 455/440 |
| 6,571,095 B1 * | 5/2003 | Koodli ...................... 455/435.1 |
| 6,678,533 B1 * | 1/2004 | Karapetkov et al. ....... 455/552.1 |
| 6,854,014 B1 * | 2/2005 | Amin et al. .................... 709/227 |
| 6,910,074 B1 * | 6/2005 | Amin et al. .................... 709/227 |
| 7,480,915 B2 * | 1/2009 | Costa Requena et al. .... 719/311 |
| 7,983,228 B1 * | 7/2011 | Choksi ......................... 370/338 |
| 8,055,262 B1 * | 11/2011 | Vu et al. .................... 455/435.1 |
| 2003/0154249 A1 * | 8/2003 | Crockett et al. ............. 709/204 |
| 2004/0184452 A1 * | 9/2004 | Huotari et al. ............... 370/384 |
| 2005/0233776 A1 * | 10/2005 | Allen et al. .................. 455/567 |
| 2006/0046714 A1 * | 3/2006 | Kalavade ..................... 455/428 |
| 2006/0063547 A1 * | 3/2006 | Otsuki ......................... 455/517 |
| 2007/0192465 A1 * | 8/2007 | Modarressi .................. 709/223 |
| 2007/0217354 A1 * | 9/2007 | Buckley ....................... 370/328 |
| 2007/0280264 A1 * | 12/2007 | Milton et al. ............ 370/395.31 |
| 2008/0004006 A1 * | 1/2008 | Datta et al. ................. 455/432.1 |
| 2008/0070619 A1 * | 3/2008 | Yu ............................. 455/552.1 |
| 2008/0139186 A1 * | 6/2008 | Ringland et al. ............. 455/415 |
| 2009/0190550 A1 * | 7/2009 | Giustina et al. .............. 370/331 |
| 2009/0296642 A1 * | 12/2009 | Keller et al. ................. 370/329 |

* cited by examiner

*Primary Examiner* — Krista Zele
*Assistant Examiner* — James Forman

(57) ABSTRACT

A client-based solution for seamless access to applications across networks is agnostic to the inter-network mix of application architectures with or without IMS. In one embodiment, an application client registers in either an integrated mode or a standalone mode based whether an application availability notification is received within a predetermined period of time.

12 Claims, 4 Drawing Sheets

US 8,301,734 B1

CLIENT-BASED SOLUTION FOR SEAMLESS ACCESS TO APPLICATIONS ACROSS NETWORKS

CROSS-REFERENCE TO RELATED APPLICATION

This application is a continuation-in-part of application Ser. No. 11/527,930, filed Sep. 26, 2006.

FIELD OF THE INVENTION

The present invention relates generally to wireless communications systems and more particularly to systems and methods for providing access to wireless applications across disparate networks.

BACKGROUND OF THE INVENTION

Wireless communications systems offer a variety of services to subscribers such as interconnect calling, short message service, packet data communications and push-to-talk (PTT) communications. Each wireless communications system operates using one or more wireless technologies such as code division multiple access (CDMA), global system for mobile communication (GSM), time division multiple access (TDMA) or Advanced Mobile Phone Service (AMPS).

Many wireless communications systems facilitate communications between a wireless application server and a client application resident on the wireless subscriber unit. For example, PTT services (also known as a walkie-talkie or dispatch services) are currently offered as an Internet protocol (IP) application served by a PTT server. Various frameworks exist for facilitating application services across a wireless network, including the Advanced Intelligent Network (AIN) and IP Multimedia Subsystem (IMS) standards.

However, as a mobile subscriber roams between wireless networks having different architectures, and operating under different protocols and standards, providing seamless access to a given wireless application becomes problematic. For example, many wireless communications systems implement proprietary standalone applications. Other wireless communications systems provide an IMS-based application architecture. As deployment of IMS becomes more prevalent in wireless networks, the mobility of subscriber terminals becomes problematic when there is need for carriers to provide seamless access to applications across networks due to a mix of IMS-based and stovepipe-based application architectures.

SUMMARY OF THE INVENTION

Disclosed and claimed herein is a method for registering an application client with a network application over a wireless network. In one embodiment, a method includes detecting a registration event for an application client executing on a subscriber unit, and determining, for a predetermined period of time, if an application availability notification has been received. The method further includes initiating an integrated mode registration process for the application client in response to receiving the application availability notification After the predetermined period of time has elapsed, the method further includes detecting the availability of a standalone application platform for the network application; and initiating a standalone mode registration process for the application client in response to detecting the standalone application platform.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Figure 1:
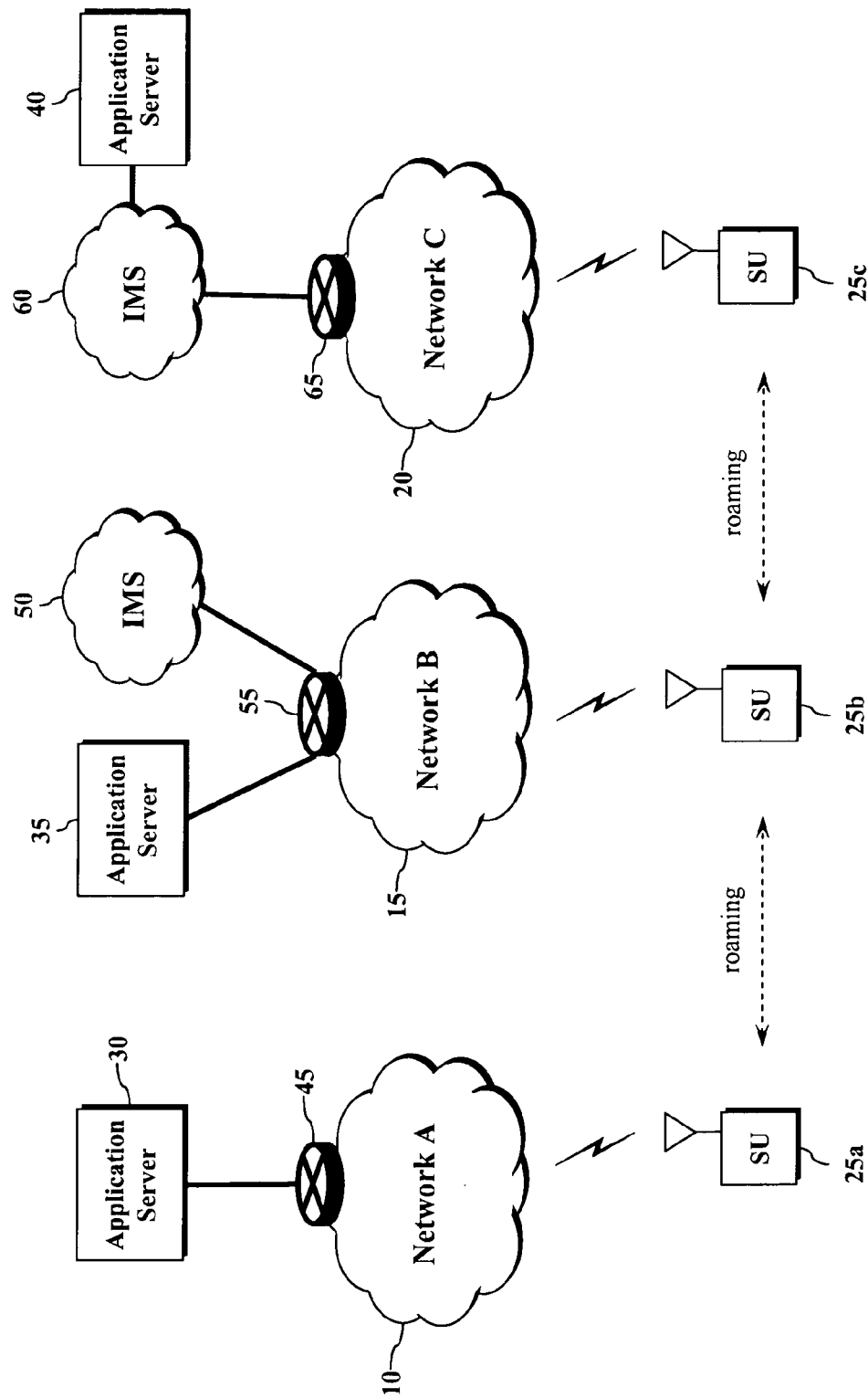
FIG. 1 is a high level block diagram illustrating three typical wireless application service architectures.

One aspect of the invention is to provide a client-based solution for seamless access to applications across networks which is agnostic to the inter-network mix of application architectures with or without IMS. In one embodiment, the presence of an added layer of intelligence in the terminal will enhance service interoperability during the transition phase to when all networks may fully integrate IMS. In another embodiment, the addition of a supervisory layer of software intelligence on the client-side may be beneficial because it creates opportunities for system maintenance, performance monitoring as well as extended functionality as the system evolves. More exactly, it creates a system entity with data links to other parts of the software system so that information can be gathered or dispersed as the system evolves. This is of special importance to telecommunications networks where standards (e.g., IMS, 3GPP) and applications are continually evolving. For example, as PTT over cellular (PoC) extends to new operators and new countries, the registration mechanism can be tuned to the subtle variations in protocol that exist from operator to operator and country to country.

Another aspect of the invention is to provide an added layer of client-side software intelligence which is effectively traverses and is agnostic to the various standards layers. This may be desirable due to the fact that successful service may require that many different standards be traversed. For example, a typical PoC application could require a special speech encoder/decoder standard at the application level, real-time transport protocol (RTP/RTSP) data control at the presentation level, session initiation protocol (SIP) at the session level, transmission control or user datagram protocol (TCP/UDP) at the transfer level, IPv4 to IPv6 at the network level, GPRS at the data link level and GSM or WCDMA at the physical level.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

Referring now to the figures, a communication system in which the invention may be used is described with reference to FIG. 1. As shown, a plurality of wireless networks 10, 15 and 20, respectively, provide communications services such as interconnect, short message service (SMS), packet data and push-to-talk (PTT), to a plurality of subscriber units 25a-25c (collectively, subscriber units 25) using one or more wireless technologies such as code division multiple access (CDMA), global system for mobile communication (GSM), time division multiple access (TDMA) or Advanced Mobile Phone Service (AMPS). It should be appreciated that the subscriber units 25 may be any device that is adapted to communicate with the wireless networks 10, 15 and 20, and may include such devices as cellular telephones, personal digital assistant, portable computers, etc.

Each wireless network 10, 15 and 20 includes an application server 30, 35 and 40, respectively. In one embodiment, the application servers 30, 35 and 40 include a 3G CDMA2000 1xEV-DO network providing Voice-over-IP ("VoIP") PTT services using Qualcomm's QChat technology, and the subscriber unit 25 is a QChat-enabled client device. PTT communications technology for 3G CDMA networks enables near-instant, one-to-one and one-to-many half-duplex communication. A PTT call may be formed by combining separate IP connections between each subscriber unit 25 at a PTT application server. Each application server 30, 35 and 40 may manage PTT calls originating within its respective network 10, 15 and 20, and provide PTT services to the subscriber units operating therein.

In operation, a PTT call may be originated by the subscriber unit 25 with the single press of a PTT button. Client software on the subscriber unit 25 initiates a call request through a corresponding application server (e.g., one of servers 30, 35 and 40) which establishes IP communications with each target subscriber unit. If a target user is available, the call originator can begin speaking. Communications between participating subscriber units are facilitated using voice-over Internet protocol (VoIP) technologies in which voice information is converted to digital form and transmitted over IP-based data networks in data packets.

As a given subscriber unit roams from network 10 onto network 15 (becoming subscriber unit 25b) and/or network 20 (becoming subscriber unit 25c), it may request access to a wireless application, such as a PTT service. In Network A, the application server 30 provides a standalone application to the subscriber unit 25, which may be accessed through an IP router 45. When the subscriber unit roams onto Network B, both standalone applications 35 and IMS-based application server 50 may be accessible through an IP router 55. Similarly, when the subscriber unit roams onto Network C, an application server 40 may be accessible as an IMS 60 application through an IP router 65. A person having ordinary skill in the art will appreciate that the illustrated embodiment is exemplary and that other combinations of network architectures, wireless and wireline devices may be inter-worked and other wireless technologies and components may be implemented.

Figure 2:
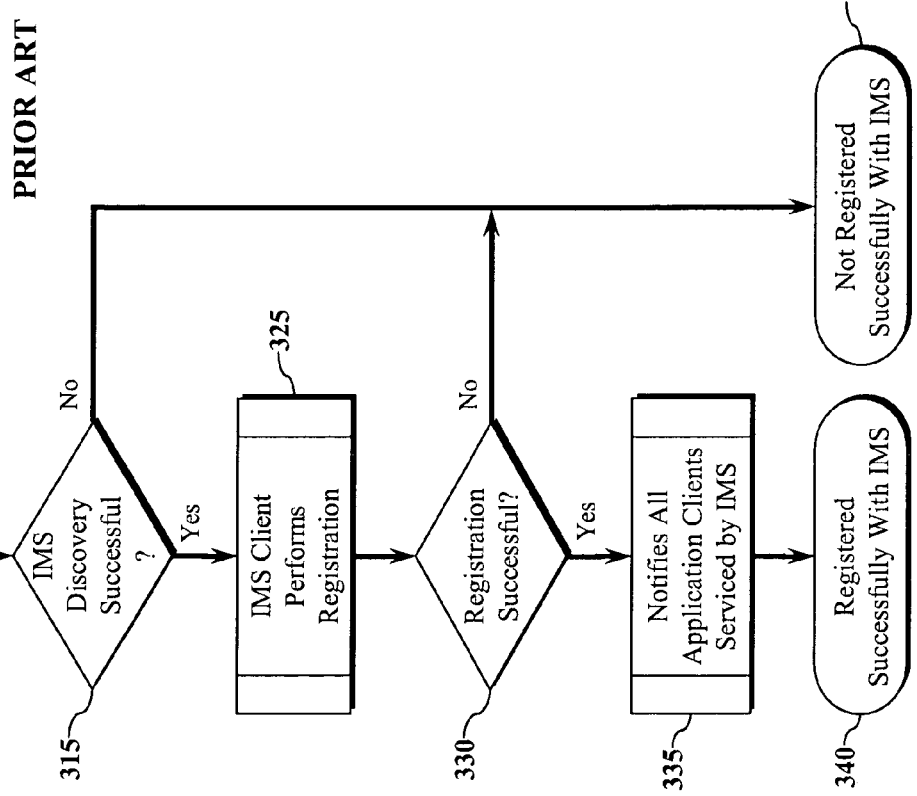
FIG. 2 is an embodiment of a typical subscriber unit.

Referring now to FIG. 2, depicted is a typical subscriber unit 25 of the prior art. As shown, subscriber unit 25 includes a control processor 70 and IMS client 75 for instructing the processor 70 to access an IMS application. Subscriber unit 25 further includes application client 80 for instructing the processor 70 to access a second type of application (e.g., non-IMS), such as a standalone application.

Figure 3:
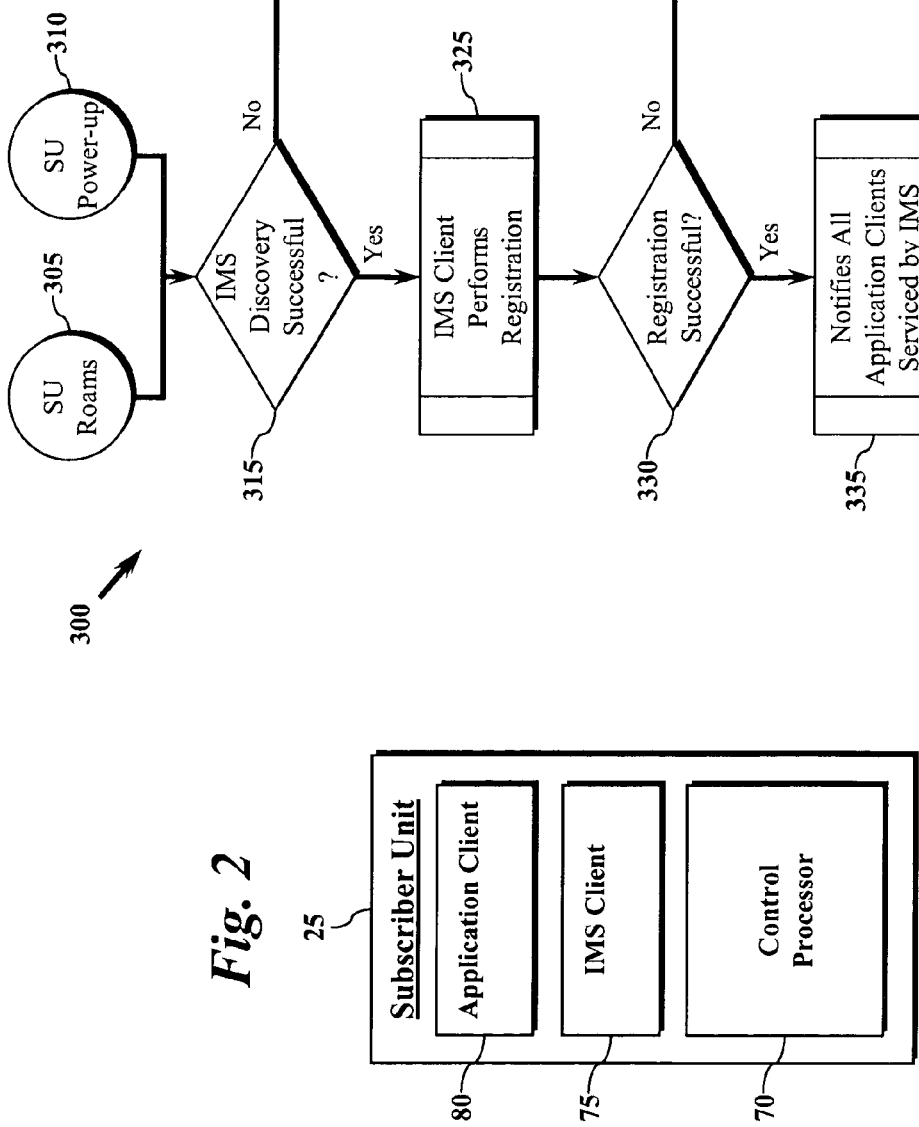
FIG. 3 is a flow diagram illustrating a typical process for IMS client registration.

As the subscriber unit roams between networks, or is otherwise powered on in a visiting network, it is typically required to re-register with the current network in order to access that network's services. To that end, the IMS client 75 implements a re-registration process 300 for an IMS-enabled subscriber unit, as illustrated in FIG. 3. The registration process 300 of FIG. 3 is executed when the subscriber unit roams onto a new network (block 305) or upon power-up of the subscriber unit (block 310). At block 315, the IMS-enabled subscriber unit attempts to discover an IMS platform (e.g., IMS server 50) in the current network (e.g., network 15) in accordance with the network's IMS discovery capabilities. If an IMS system is not found, the subscriber unit simply cannot register for IMS services and the program terminates at block 320. If, on the other hand, IMS services are discovered at block 315, then process 300 will proceed to block 325 where the IMS-enabled subscriber unit attempts to register with the newly-discovered IMS server.

Thereafter, at block 330, a determination is made as to whether the subscriber unit is unable to register. If the subscriber unit is in fact unable to register, process 300 will proceed to and terminate at block 320. If registration is successful, then at block 335 the IMS client 75 may notify all resident IMS application clients on the IMS-enabled subscriber unit, after which process 300 may terminate at block 340.

Figure 4:
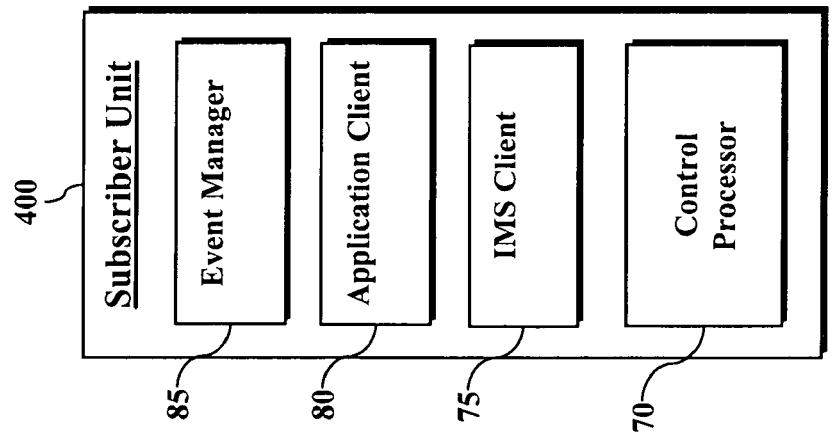
FIG. 4 is an embodiment of a subscriber unit configured in accordance with one embodiment of the invention.

Referring now to FIG. 4, depicted is one embodiment of a subscriber unit 400 in accordance with the principles of the invention. As shown, subscriber unit 25 includes a control processor 70 and IMS client 75 for instructing the processor 70 to access an IMS application. Subscriber unit 25 further includes application client 80 for instructing the processor 70 to access a second type of application (e.g., non-IMS), such as a standalone application. However, unlike a typical subscriber unit, subscriber unit 400 further includes an event manager 85 for carrying out the processes of the invention, such as the process described below with reference to FIG. 5. It should further be appreciated by one skilled in the art that IMS Client 75, Application Client 80 and/or the Event Manager 85 may be implemented in software, hardware, firmware or any combination thereof. It should further be understood that one or more of the IMS Client 75, Application Client 80 and/or Event Manager 85 may be combined into a single functioning element. In still other embodiments, the IMS Client 75 includes a notification timer set to the period of time that must elapse before it stops checking for IMS availability. Similarly, the Applicant Client 80 may also include a timer for setting the period of time that the Event Manager 85 and/or the Application Client 80 wait to receive a service notification from the IMS client 75. In certain embodiments, the timeout period for the Applicant Client 80 exceeds the timeout period for the IMS client 75.

Figure 5:
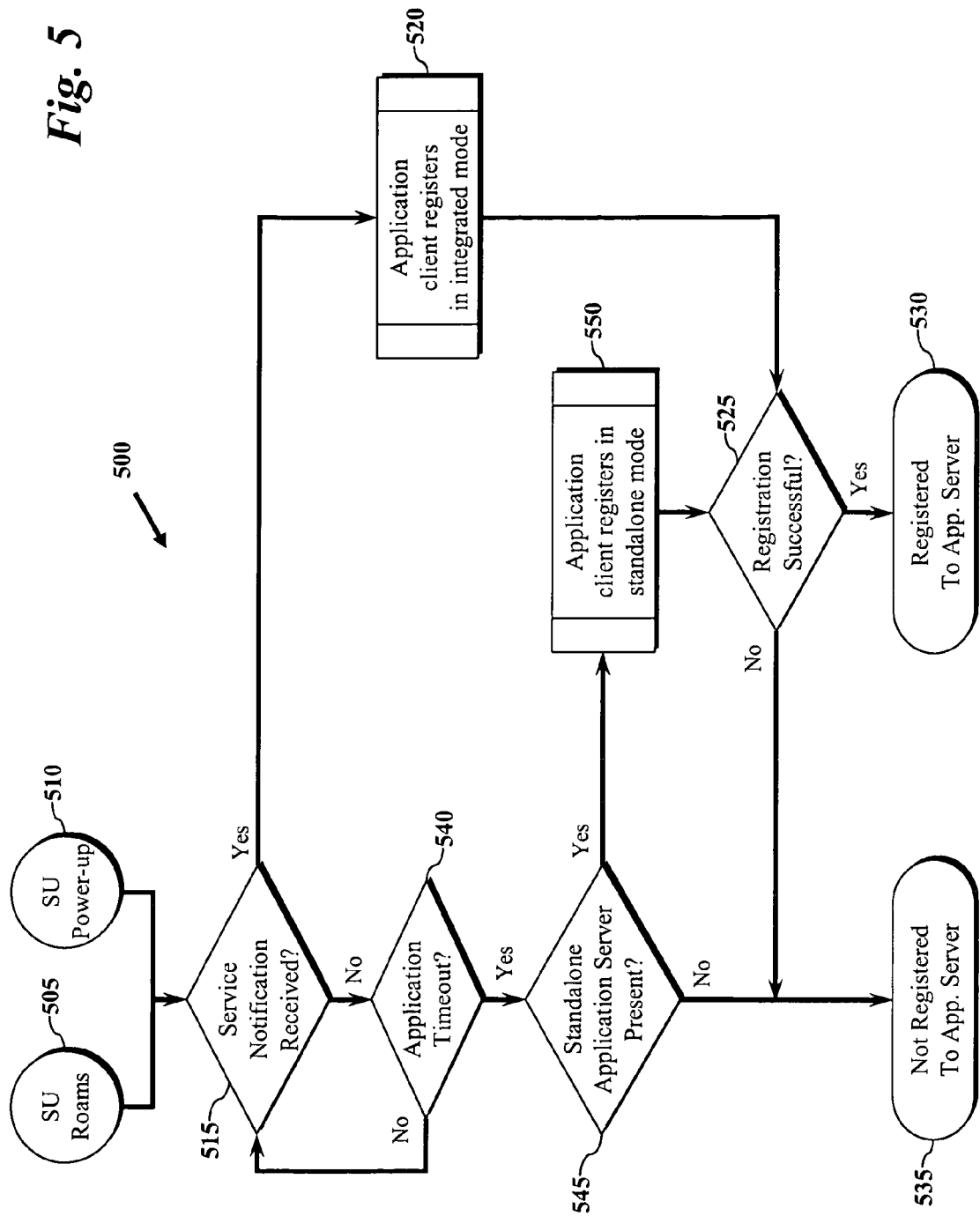
FIG. 5 is one embodiment of a flow diagram for implementing one or more aspects of the invention.

FIG. 5 is one embodiment of a process 500 carried out by the Event Manager 85 in conjunction with either or both of an IMS client (e.g., IMS Client 75) and application client (e.g. application client 80). In certain embodiments, process 500 may be carried out to provide subscriber access to an application server regardless of the presence and/or availability of IMS. While in one embodiment the application client may be a PTT client, the principles disclosed herein are equally applicable to any other types of application clients, such as location-based service (LBS) clients. As with process 300, the registration process 500 of FIG. 5 may be initiated when a subscriber unit roams onto a new network (block 505) or upon power-up of the subscriber unit (block 510).

Thereafter, at block 515 a decision is made as to whether an application availability notification has been received either from the network itself or from the IMS client (e.g., IMS client 75), depending on how the application server is integrated with IMS. In one embodiment, this check may be made by the event manager (e.g., Event Manager 85). If such a notice is received, process 500 moves to block 520 where the application client will assume the network has integrated the application into IMS and will hence attempt to register in integrated mode. A determination may then be made at block 525 as to whether the registration attempt of block 520 was successful or not. If so, then process 500 will continue to block 530 where process 500 terminates with the application client being registered to the application server. If, on the other hand, it is determined at block 525 that the registration attempt of block 520 was not successful, then process 500 will end at block 535 with the application client not being registered with the application server.

If, on the other hand, it is determined at block 515 that no service notification has been received (either from the network or the IMS client), process 500 will continue to block 540 where a determination may then be made as to whether the application client has timed out. In one embodiment, the application client timer may be longer than the timer for the IMS client, as discussed above. If the applicant client timer has not yet timed out, process 500 reverts to block 515 where the process 500 continues to check for the service notification. If, on the other hand, it is determined that no service notification has been received and the application client timer has now timed out, process 500 will continue to block 545.

At block 545, the process 500 will attempt to discover support for a standalone application platform, such as the standalone application server 30 or 35. If a standalone application platform is detected, process 500 will continue to block 550 where the application client will assume that the application is being implemented in standalone form and will attempt to register in a standalone mode regardless of the presence of IMS. A determination may then be made at block 525 as to whether the registration attempt of block 550 was successful or not. If so, then process 500 will continue to block 530 where the process ends with the application client being registered to the application server. If, on the other hand, the registration attempt of block 550 was not successful, then process 500 terminates at block 535 with the application client not being registered to the application server.

By way of a exemplary implementation of process 500, suppose that a network (e.g., network 10, 15 or 20) supports using a standalone PTT application platform (e.g., application server 30, 35 or 40). Further, suppose that a subscriber unit (e.g., subscriber unit 30) is equipped with a PTT client, which is one embodiment of the application client 80. In this case, upon roaming (e.g., block 505) to or powering up (e.g., block 510) within the network in question, the PTT client may wait to receive a service notification from the IMS client for some predetermined period of time before it times out. If a notice is received, the PTT client will assume that the PTT application has been integrated with IMS and will accordingly attempt register in integrated mode (e.g., block 520).

If no such notification is received, the PTT client will attempt to discover support for a standalone application platform, such as the standalone application server 30 or 35. In certain embodiments, this may be done by having the PTT client query the network's domain name server (DNS) for a Regional Location Server (RLS) address. If the network has not integrated the PTT application with its IMS network, the PTT client will be able to resolve the RLS address successfully. The PTT client will assume that the PTT client is implemented in standalone mode and register accordingly (e.g., block 550). It should be appreciated that different mechanisms may be used, depending on the application platform, to determine if the application has been implemented in standalone mode.

For the sake of simplicity, process 500 has been defined in general steps and it should be appreciated that other steps consistent with the principles of the invention may be included. While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for registering an application client with a network application across an inter-network mix of application architectures with or without IP Multimedia Subsystem (IMS), the method comprising:

initiating a registration process for registering the application client of a subscriber unit with the network application of the wireless network at the application client executing on the subscriber unit, including:

determining if an application availability notification has been received, wherein:

in response to determining that the application availability notification has been received, initiating an integrated mode registration process between the application client and an IMS network of the wireless network; and in response to determining that the application availability notification has not been received, determining after a predetermined period of time if a standalone application platform for the network application of the wireless network is detected, wherein the standalone application platform is an application server that is not integrated with the IMS network of the wireless network; and initiating a standalone mode registration process with the standalone application platform in response to detecting the standalone application platform of the wireless network and instead of initiating the integrated mode registration process.

2. The method of claim 1, wherein the network application is a push-to-talk application.

3. The method of claim 1, wherein the determining if a standalone application platform for the network application of the wireless network is detected includes querying a domain name server of the wireless network for a location server address.

4. The method of claim 3, wherein the standalone application platform is detected if the location server address is resolved.

5. A wireless subscriber unit which is agnostic to an inter-network mix of application architectures with or without IP Multimedia Subsystem (IMS), the subscriber unit comprising:

memory containing an application client and instructions for registering the application client with a network application; and a processor coupled to the memory, the processor to execute the instructions and wherein the instructions include:

initiating a registration process for registering the application client of the subscriber unit with the network application of a wireless network at the application client executing on the subscriber unit, including:

determining if an application availability notification has been received, wherein:

in response to determining that the application availability notification has been received, initiating an integrated mode registration process between the application client and an IMS network of the wireless network; and in response to determining that the application availability notification has not been received, determining after a predetermined period of time if a standalone application platform for the network application of the wireless network is detected, wherein the standalone application platform is an application server that is not integrated with the IMS network of the wireless network; and initiating a standalone mode registration process with the standalone application platform in response to detecting the standalone application platform of the wireless network and instead of initiating the integrated mode registration process.

6. The subscriber unit of claim 5, wherein the network application is a push-to-talk application.

7. The subscriber unit of claim 5, wherein the determining if a standalone application platform for the network application of the wireless network is detected includes the processor querying a domain name server of the wireless network for a location server address.

8. The subscriber unit of claim 7, wherein the standalone application platform is detected if the location server address is resolved.

9. A computer program product comprising:

a non-transitory computer readable medium having computer program code embodied therein for registering an application client with a network application across an inter-network mix of application architectures with or without IP Multimedia Subsystem (IMS), wherein the computer program code comprises computer readable program code to:

initiate a registration process for registering the application client of a subscriber unit with the network application of the wireless network at the application client executing on the subscriber unit, including:

determining if an application availability notification has been received, wherein:

in response to determining that the application availability notification has been received, initiating an integrated mode registration process between the application client and an IMS network of the wireless network; and in response to determining that the application availability notification has not been received, determining after a predetermined period of time if a standalone application platform for the network application of the wireless network is detected, wherein the standalone application platform is an application server that is not integrated with the IMS network of the wireless network; and initiating a standalone mode registration process with the standalone application platform the standalone application platform of the wireless network and instead of initiating the integrated mode registration process.

10. The computer program product of claim 9, wherein the network application is a push-to-talk application.

11. The computer program product of claim 9, wherein the determining of whether a standalone application platform for the network application of the wireless network is detected includes querying a domain name server of the wireless network for a location server address.

12. The computer program product of claim 11, wherein the standalone application platform is detected if the location server address is resolved.

* * * * *